United States Patent Office 3,477,904
Patented Nov. 11, 1969

3,477,904
HYDRAZIDES OF FATTY QUATERNARY AMMONIUM SALTS OF GLYCINE AS RETENTION AGENTS
Charles L. Mehltretter, Peoria, Ill., assignor to the United States of America as represented by the Secretary of Agriculture
No Drawing. Filed Sept. 30, 1966, Ser. No. 584,063
Int. Cl. D21h 3/28
U.S. Cl. 162—175                                6 Claims

ABSTRACT OF THE DISCLOSURE

The invention comprises (1) a cationic composition of gelatinized starch and a suaternary ammonium hydrazide salt that contains one fatty aliphatic radical having from 8 to 18 carbon atoms, the gelatinized starch and hydrazide salt being linked through complex formation and (2) a process for using said composition to increase the retention of starch and clay in cellulosic fibers in papermaking by adding said composition to cellulosic pulp fibers in water to form an aqueous dispersion, adjusting the pH to about 4 with hydrochloric acid, stirring the resulting mixture, and filtering the mixture to remove the water and recover the fibers and retained starch.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to novel quaternary ammonium derivatives and particularly to quaternary ammonium glycine hydrazide salts which are surprisingly effective as cationic retention agents in papermaking.

The quaternary ammonium glycine hydrazide salts of the present invention are represented by the formula

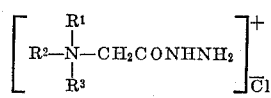

wherein $R^1$ is an aliphatic hydrocarbon radical selected from those containing at least 8 and preferably 10 to 18 carbon atoms and mixtures thereof, and $R^2$ and $R^3$ are the same or different radicals selected from the group consisting of methyl and ethyl.

It is known in the art to produce betaines, i.e., esters of carboxymethyl fatty quaternary ammonium salts by reacting an appropriate tertiary amine with an ester of an α-monohalogenated aliphatic carboxylic acid. These prior art betaine esters have antiseptic utility as described in U.S. Patent No. 2,367,878.

It is an object of the present invention to react the prior art fatty betaine esters with hydrazine to produce the corresponding novel cationic hydrazide salts having high solubility in water. Depending upon the particular product desired, the high molecular weight dimethyl amines used in forming the several betaine starting materials may be dimethylhexadecyl amine or dimethyloctadecyl amine or the substantially fractionated mixed amines from the mixed fatty acids of vegetable oils and animal fats, the character of these mixed amines being indicated in terms of their origin, e.g., dimethylsoy amine, dimethyl cocoamine, or dimethylhydrogenated tallow amine, which low cost mixed amines are available from Armour Industrial Chemical Co., Chicago, Ill., under the "Armeen" trademark. The reaction mechanism for the preparation of the novel cationic hydrazide salts may be illustrated by the following equations:

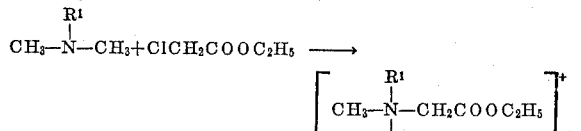

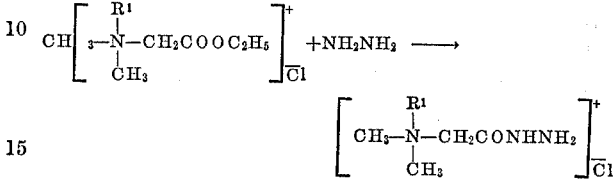

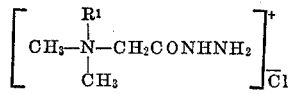

wherein R′ may be, for example, hexadecyl or octadecyl.

We have surprisingly found that the addition of a small proportion of a novel cationic hydrazide salt of the subject invention to an aqueous slurry of unmodified starch prior to cooking the slurry induces a high retention of the cooked starch on a subsequently added cellulosic pulp at pH 3.5–4.5. Likewise, a simple addition to cellulosic pulps of aqueous solutions of the hydrazide salts of this invention alone or in the form of cooked hydrazide-starch mixtures at pH 3.5–4.5 provides a high retention of such pigments as papermakers clay by the cellulosic pulp, which is of importance in the papermaking process. Although the hydrazide-starch mixtures of the invention are cationic, they are not to be confused with the presently available "cationic starches" which are produced by explicit chemical reaction of a cationic agent with starch as described in U.S. Patent No. 2,813,093 and which are relatively costly to manufacture.

The starches that can be used within the scope of the invention are the simple low-cost chemically unmodified cereal starches of corn, wheat, sorghum, and rice.

The following examples are intended to illustrate rather than to limit the scope of the invention.

EXAMPLE 1

Hydrazide of carboxymethyldimethylsoyammonium chloride 62.8 g. of dimethylsoyamine, marketed as "Armeen DMSD" by Armour Industrial Chemical Co., Chicago, Ill., was dissolved in 50 ml. of absolute ethanol and after addition of 24.5 g. of ethyl chloroacetate the solution was refluxed for 4 hours. Volume of the solution was 140 ml. Fifty-three milliliters of the solution was concentrated in vacuo to remove the ethanol solvent and yielded 33.5 g. of an oil which crystallized to a nearly white waxy product. The crystals of the ethyl ester of carboxymethyldimethylsoyammonium chloride was removed by filtration and washed with ether.

Analysis.—Found: N, 3.6%; Cl, 8.7%. Calcd.: N, 3.4%; Cl, 8.6%. The mean molecular weight of the ester was 415.

A 53 ml. portion of the ethanol solution containing 33.5 g. of ethyl ester of carboxymethyldimethylsoyammonium chloride was reacted with 2.6 ml. of 95 percent hydrazine at room temperature overnight. The reaction mixture was concentrated in vacuo to remove ethanol and yielded 35.6 g. of an amber colored semicrystalline hydrazide salt. The hydrazide of carboxymethyldimethylsoyammonium chloride, having the formula

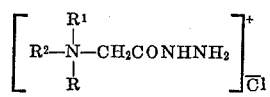

wherein $R^1$ is a mixture of saturated and unsaturated aliphatic hydrocarbon radicals containing predominantly 18 carbo natoms, and R² and R³ are methyl radicals, was recrystallized from an ethanol-ether mixture. More specifically, R′ in the aforementioned formula is a mixture consisting of 20% hexadecyl, 17% octadecyl, 26% octadecenyl, and 37% octadecadienyl.

*Analysis.*—Found: N, 10.6%. Calcd.: N, 10.5%. The mean molecular weight of the hydrazide salt was 401. The product was very soluble in water.

EXAMPLE 2

Hydrazide of carboxymethyldimethylcocoammonium chloride 48.8 g. of dimethylcocoamine, marketed as "Armeen DMCD" by Armour Industrial Chemical Co., was dissolved in 50 ml. of ethanol and reacted with 34.5 g. of ethyl chloroacetate. The volume of solution was 126 ml. 47.3 ml. of the reaction solution containing the ethyl ester was reacted at room temperature with 2.6 ml. of 95% hydrazine for 22 hours. The mixture was concentrated in vacuo and yielded 38.2 g. of a semicrystalline waxy hydrazide salt, i.e., the hydrazide of carboxymethyldimethylcocoammonium chloride having the formula

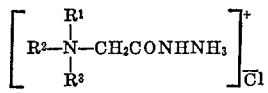

wherein R′ is amixture of aliphatic hydrocarbon radicals containing from 8 to 18 carbon atoms, and R² and R³ are methyl radicals. More specifically, R′ is a mixture consisting of 8% octyl, 9% decyl, 47% dodecyl, 18% tetradecyl, 8% hexadecyl, 5% octadecyl, and 5% octadecenyl.

*Analysis.*—Found: N, 12.4%; Cl, 10.5%. Calcd.: N, 12.5%; Cl, 10.5%. The mean molecular weight of the hydrazide salt was 337. The product was soluble in water.

EXAMPLE 3

Hydrazide of carboxymethyldimethylhexadecylammonium chloride 26.9 g. of dimethylhexadecylamine, marked as "Armeen DM 16–D" by Armour Industrial Chemical Co., was reacted with 12.26 g. of ethyl chloroacetate in 25 ml. of methanol by refluxing for 4 hours. After 3 hours of standing, 3.5 ml. of 95% hydrazine was added to the solution and the whole allowed to stand at room temperature overnight. The clear amber colored solution was concentrated in vacuo to remove the solvent, and 40 g. of the nearly white waxy solid, i.e., the hydrazide of carboxymethyldimethylhexadecylammonium chloride, having the formula

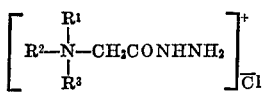

wherein R¹ is the hexadecyl radical containing 16 carbon atoms, and R² and R³ are methyl radicals, was obtained.

*Analysis.*—Found: N, 10.8%; Cl, 9.6%. Calcd.: N, 11.1%; Cl, 9.4%. The mean molecular weight of the hydrazide salt was 378. The product was soluble in water.

EXAMPLE 4

Hydrazide of carboxymethyldimethylhydrogenated tallow ammonium chloride 58.6 g. of dimethylhydrogenated tallow amine, marketed as "Armeen DMHT" by Armour Industrial Chemical Co., was reacted with 24.5 g. of ethyl chloroacetate by the procedure of Example 1. Volume of solution was 142 ml. Fifty-two milliliters of this solution was concentrated in vacuo to give 32.5 g. of the crude ester of carboxymethyldimethylhydrogenated tallow ammonium chloride. Recrystallization from acetone gave a white solid which analyzed as follows:

*Analysis.*—Found: N, 9.5%; Cl, 3.6%. Calcd.: N, 8.5%; Cl, 3.4%. This ester had a mean molecular weight of 416.

To another 52 ml. portion of the ethyl ester solution was added 2.6 ml. of 95% hydrazine and the mixture was allowed to react at room temperature overnight. Crystallization occurred and the product was slurried in ethanol, filtered, and washed with fresh ethanol: 15 g. of white hydrazide of carboxymethyldimethylhydrogenated tallow ammonium chloride, having the formula

wherein R¹ is a mixture of aliphatic hydrocarbon radicals containing predominantly 18 carbon atoms, and R² and R³ are methyl radicals, was obtained. More specifically, R′ in the said formula is a mixture consisting of 2% tetradecyl, 24% hexadecyl, 71% octadecyl, and 3% octadecenyl. The hydrazide salt analyzed as follows:

*Analysis.*—Found: N, 10.4%; Cl, 9.8%. Calcd.: N, 10.4%; Cl, 8.8%. The hydrazide salt had a mean molecular weight of 402 and was very soluble in water.

EAXMPLE 5

Hydrazide of carboxymethyldimethyloctadecyl ammonium chloride

A solution of 0.2 mole of dimethyloctadecylamine, marked as "Armeen DM 18–D" by Armour Industrial Chemical Co., was dissolved in 50 ml. of absolute ethanol and the solution refluxed with 0.2 mole of ethyl chloroacetate for four hours. After standing overnight at room temperature the ethyl ester reaction mixture was reacted with 0.2 mole of hydrazine. The crude crystalline hydrazide salt, i.e., the hydrazide of carboxymethyldimethyloctadecylammonium chloride having the formula

wherein R¹ is the octadecyl radical containing 18 carbon atoms, and R² and R³ are methyl radicals, was isolated by concentration of the reaction solution in vacuo. It was recrystallized from ethanol.

*Analysis.*—Found: N, 9.9%; Cl, 8.4%. Calcd.: N, 10.4%; Cl, 8.8%. The mean molecular weight of the hydrazide salt was 406. The product was soluble in water.

EXAMPLE 6

Solution I.—To 0.30 g. of unmodified pearl corn starch (dry basis) suspended in 20 ml. of water was added 0.2 ml. of a 1.5% aqueous solution of the hydrazide salt of Example 5 and the whole cooked at 100° C. for 15 minutes.

Six milliliters of Solution I (which contained 0.0009 g. of the hydrazide salt and 0.09 g. of starch that is 1 part by weight to 100 parts by weight salt to starch) was added to 3 g. of bleached sulfite pulp (dry basis) suspended in 250 ml. of water by continuous mechanical stirring. Several drops of N hydrochloric acid were then added to the pulp suspension to lower the pH to about 4 and 15 ml. of a 0.1% solution of an anionic pigmented dye ("Halopont Blue RNM," trademark of E. I. du Pont de Nemours and Co., Wilmington, Del.) was added according to the method described in TAPPI 48, p. 506 (1963). After 5 minutes of stirring the suspension was filtered as described in the said method, and the clear filtrate was found to contain only 13% of the dye that was originally added. The cellulosic pulp hydrazide-starch complex therefore had retained 87% of the anionic dye; also, by analysis, it was found that 81% of the starch was retained by the pulp. A control using the same pulp and an identical starch dispersion and dye, but without the hydrazide salt adsorbed only 30% of the dye added. Furthermore, in the absence of the hydrazide salt, only 61% of the starch was retained by the pulp. The adsorption or retention of 87% of the anionic dye indicates the highly cationic nature of the cellulosic pulp hydrazide starch complex. This high cationic effect also allows the beneficial retention by the pulp of a high percentage (81%) of the starch added.

EXAMPLE 7

To 3.0 g. of bleached sulfate pulp (dry basis) suspended in 250 ml. of distilled water by mechanical stirring was added 6 ml. of Solution I of Example 6 and 0.6 g. of papermakers clay pigment. After adjustment to pH 4 with dilute hydrochloric acid and stirring for 5 minutes, the mixture was filtered without filter paper on a Buchner funnel of 2½-in. diameter. The filtrate was returned to the funnel and refiltered through the accumulated cellulosic fiber filter bed under slight vacuum. A clear, colorless filtrate was obtained which showed that Solution I gave excellent retention on the pulp.

A control run as above was made with an equivalent starch solution containing no hydrazide salt. Even after the second filtration this filtrate was very cloudy and contained a high percentage of clay which was not retained by the pulp.

Thus, a suspension of pulp containing 20% of clay (dry pulp basis) after treatment with the hydrazide-starch complex containing the hydrazide salt of Example 5, retained nearly 100% of the clay. (The concentration of starch was 3% based on dry pulp: that of the hydrazide salt was only 0.03% on dry pulp basis or 0.6 pound per ton of dry basis pulp.)

EXAMPLE 8

To 3.0 g. of bleached sulfate pulp (dry basis) suspended in 250 ml. of water at pH of about 4 was added 0.2 ml. of a 1.5% aqueous solution of the hydrazide salt of Example 5. Fifteen milliliters of 0.1% anionic dye solution (TAPPI 46:8, p. 506 (1963)) was added and the mixture filtered after 5 minutes stirring. The filtrate was passed through the Büchner funnel again under slight vacuum, and the clear filtrate assayed for dye content. Almost all of the dye (95%) was retained by the pulp.

The pulp above in a control run without hydrazide salt retained only about 15% of the dye.

Thus, the addition of only 0.1% of the hydrazide salt to the pulp (dry pulp basis) gave excellent retention properties to the pulp for the anionic dye.

EXAMPLE 9

To 3.0 g. of bleached sulfate pulp (dry basis) suspended in 250 ml. of distilled water and adjusted to pH 4 was added 0.2 ml. of a 1.5% aqueous solution of the hydrazide salt of Example 5 followed by the addition of 0.6 g. of papermakers clay. After stirring for 5 minutes the slurry was filtered and refiltered as in Example 7. A nearly clear, colorless filtrate was obtained which indicated that practically all of the clay was retained by the pulp.

A control run was made with pulp and clay in the absence of the hydrazide salt solution, which gave a very cloudy filtrate containing a high percentage of the clay.

Thus, high retention of the clay by the pulp was obtained with the cationic hydrazide salt of Example 5 in a concentration of only 0.1% (dry pulp basis).

EXAMPLE 10

To 0.30 g. of pearl corn starch (dry basis) suspended in 20 ml. of distilled water was added 0.1 ml. of a 3% aqueous solution of the hydrazide of carboxymethyldimethylsoyammonium chloride of Example 1 and the mixture was heated at 100° C. for 5 minutes with continuous agitation.

Six milliliters of the above dispersion was added to 3.0 g. of bleached sulfate pulp (dry basis) suspended in 250 ml. of water by mechanical stirring. Several drops of N hydrochloric acid were then added to the pulp suspension to adjust the pH to 4 and 15 ml. of a 0.1% anionic dye solution was added. After 5 minutes of stirring the suspension was filtered and the filtrate after refiltration through the pulp mat was clear. Analysis for dye in the filtrate showed that 77% of the anionic dye was retained by the pulp and that the treated pulp was highly cationic.

In an analogous experiment without dye addition the clear filtrate was assayed for starch and the results obtained showed that 76% of the starch added as the cationic complex was retained by the pulp.

EXAMPLE 11

To 0.30 g. of pearl corn starch (dry basis) suspended in 20 ml. of distilled water was added 0.1 ml. of a 3% aqueous solution of the hydrazide of carboxymethyldimethylcocoammonium chloride and the mixture was heated at 95–100° C. for 10 minutes with stirring.

Six milliliters of the above dispersion was added to 3.0 g. of bleached sulfate pulp (dry basis) suspended in 250 ml. of water by mechanical stirring. Several drops of N hydrochloric acid were added to obtain pH of 3.9. After 5 minutes of stirring the suspension was filtered and refiltered through the pulp mat and a clear colorless solution was obtained. Analysis for starch showed that 86% of the starch that had been added was retained by the pulp.

EXAMPLE 12

To 0.30 g. of pearl corn starch (dry basis) suspended in 20 ml. of water was added 0.1 ml. of a 3% aqueous solution of the hydrazide of carboxymethyldimethylhydrogenated tallow ammonium chloride and the mixture was heated at 95° C. for about 10 minutes to obtain a homogenous, thin, slightly opalescent dispersion.

Six milliliters of the above dispersion were added to 3.0 g. of bleached sulfate pulp (dry basis) suspended in 250 ml. of water by mechanical stirring. Several drops of N hydrochloric acid were added to obtain pH 4.3 and 15 ml. of a 0.1% anionic dye solution was added. After 5 minutes of stirring the blue suspension was filtered and refiltered through the pulp mat. The clear filtrate was analyzed for dye and the results showed that 92% of the anionic blue dye was retained by the cationic pulp.

In an analogous experiment without dye addition the clear filtrate was assayed for starch and the results obtained showed that 91% of the starch used as the cationic complex was retained by the pulp.

In still another experiment in which 6 ml. of the starch-cationic complex dispersion was added to the pulp at pH 4.3 and then 0.6 g. of papermakers clay was added followed by stirring for 5 minutes and the suspension filtered and refiltered through the pulp mat, the filtrate was strongly opalescent. Thus, without the addition of the starch-cationic complex, a cloudy filtrate containing much clay was obtained.

I claim:

1. A cationic quaternary ammonium glycine hydrazide salt additive for retaining gelatinized starch on cellulosic pulp fibers, said hydrazide salt having the general formula

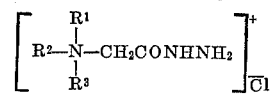

wherein R' is an aliphatic hydrocarbon radical selected from those containing from 8 to 18 carbon atoms and mixtures thereof, and $R^2$ and $R^3$ are each methyl.

2. The additive of claim 1 wherein R' contains 18 carbon atoms.

3. A cationic composition of gelatinized starch and a quaternary ammonium glycine hydrazide salt having the general formula

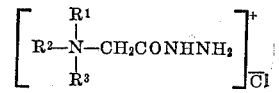

wherein $R^1$ is an aliphatic hydrocarbon radical selected from those containing from 8 to 18 carbon atoms and mixtures thereof, and $R^2$ and $R^3$ are each methyl, the gelatinized starch and the hydrazide salt being linked by complex formation, said composition containing about 1 part by weight of the hydrazide salt per 100 parts by weight of the starch.

4. A process of increasing the retention of gelatinized starch on cellulosic pulp fibers for use in papermaking comprising mixing 3 grams of the pulp fibers suspended in 250 ml. of water with 6 ml. of an aqueous dispersion of the gelatinized starch-hydrazide salt complex of claim 3 containing 0.09 gram of gelatinized starch and 0.0009 gram of the hydrazide salt, adjusting the pH of the resulting suspension to about 4 with hydrochloric acid, stirring the resulting mixture, and filtering said mixture to remove the water therefrom.

5. A process of increasing the retention of papermakers' clay on cellulosic pulp fibers for use in papermaking comprising mixing 3 grams of the pulp fibers suspended in 250 ml. of water, 6 ml. of an aqueous dispersion of the gelatinized starch-hydrazide salt complex of claim 3 containing 0.09 gram of gelatinized starch and 0.0009 gram of the hydrazide salt, and 0.6 gram of papermakers' clay, adjusting the pH of the resulting mixture to about 4 with hydrochloric acid, stirring the resulting mixture, and filtering said mixture to remove the water therefrom.

6. A process comprising cooking and gelatinizing 100 parts by weight of starch with 1 part by weight of a quaternary ammonium glycine hydrazide salt having the general formula

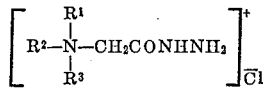

wherein $R^1$ is an aliphatic hydrocarbon radical selected from those containing from 8 to 18 carbon atoms and mixtures thereof, and $R^2$ and $R^3$ are each methyl, in water at 95° to 100° C. for at least 5 minutes to form a complex between the gelatinized starch and the hydrazide salt which is characterized by possessing cationic properties.

References Cited

UNITED STATES PATENTS 3,113,026  12/1963  Sprung _____ 260—567.6 XR

S. LEON BASHORE, Primary Examiner

R. H. TUSHIN, Assistant Examiner

U.S. Cl. X.R.

127—33; 162—181; 260—233.3, 567.6